United States Patent [19]

Hashimoto

[11] Patent Number: 4,675,897

[45] Date of Patent: Jun. 23, 1987

[54] AUTOMATIC TELEPHONE ANSWERING APPARATUS AND METHOD HAVING VOICE MONITORING FUNCTION

[75] Inventor: Kazuo Hashimoto, Tokyo, Japan

[73] Assignee: Hashimoto Corporation, Tokyo, Japan

[21] Appl. No.: 713,812

[22] Filed: Mar. 20, 1985

[51] Int. Cl.⁴ .............................................. H04M 1/65
[52] U.S. Cl. ...................................... 379/80; 381/110
[58] Field of Search ......................... 179/6.14; 379/80; 381/110

[56] References Cited

U.S. PATENT DOCUMENTS

| | | | |
|---|---|---|---|
| 3,798,382 | 3/1974 | Hoven | 179/6.14 |
| 3,864,519 | 2/1975 | Owen | 179/6.14 |
| 3,864,520 | 2/1975 | Owen | 179/6.14 |
| 4,296,277 | 10/1981 | Daneffel | 179/6.14 |

Primary Examiner—Raymond F. Cardillo
Assistant Examiner—James E. Tomassini
Attorney, Agent, or Firm—Lowe Price LeBlanc Becker & Shur

[57] ABSTRACT

In an automatic telephone answering apparatus, an input signal sent through telephone lines is enveloped to derive pulses. The pulses are counted by a first counter. When a predetermined period of time has elapsed, a count of the first counter is compared with a reference value. When the count is larger than the reference value, the input signal is regarded as a speech signal, and the first and second counters are reset to count the pulses again. The above operation is repeated. When the count has not reached the reference value, the second counter is operated. When another predetermined period of time has elapsed, the count of the first counter is compared with the reference value, and this operation is repeated. When the count of the second counter reaches a given value, the automatic telephone answering apparatus is set in the standby mode.

1 Claim, 2 Drawing Figures

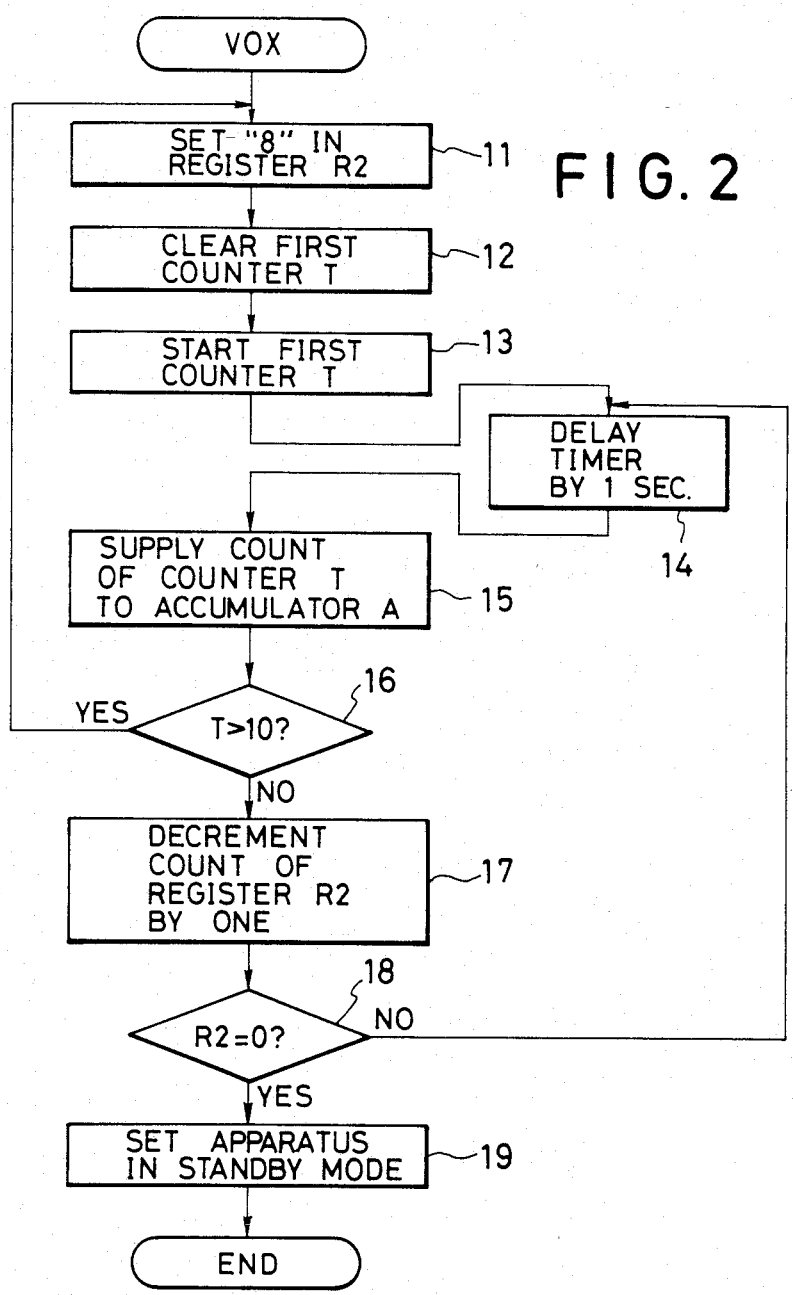

AUTOMATIC TELEPHONE ANSWERING APPARATUS AND METHOD HAVING VOICE MONITORING FUNCTION

BACKGROUND OF THE INVENTION

1. Field of the Invention

The present invention relates to an automatic telephone answering apparatus and, more particularly, to an automatic telephone apparatus for detecting the presence/absence of an incoming message of a calling party and controlling a recording time of a recording means such as an incoming message tape.

2. Description of the Prior Art

An automatic telephone answering apparatus is automatically engaged with a telephone line upon reception of an incoming call, sends out an outgoing message to a calling party, and drives a recording unit to record an incoming message of the calling party. Thereafter, the automatic telephone answering apparatus is set in the standby mode. In a conventional automatic telephone answering apparatus, a drive time of a recording unit is limited by a timer or the like to a predetermined period of time. In another conventional apparatus, a speech control circuit such as an analog switch is operated to detect whether or not an incoming message is received from a calling party. When an incoming message is no longer detected and a blank portion continues, the speech control circuit detects that the incoming message is ended to disable the recording means and sets the automatic telephone answering apparatus in the standby mode. However, according to this system for controlling the recording time by the speech control circuit, when a calling party stops speaking during recording for a short period of time, the speech control circuit is operated to set the automatic telephone answering apparatus in the standby mode, resulting in inconvenience. However, when a blank time interval for actuating the speech control circuit is prolonged, the speech control circuit detects a busy tone or a dial tone after a calling party finishes recording a message. As a result, the automatic telephone answering apparatus cannot be set in the standby mode even if a message of a calling party is completely recorded, resulting in inconvenience.

SUMMARY OF THE INVENTION

It is a first object of the present invention to provide an automatic telephone answering apparatus for controlling a recording time of an incoming message of a calling party in accordance with a message voice of the calling party.

It is a second object of the present invention to provide an automatic telephone answering apparatus for discriminating a dial tone, a busy tone, a voice and a blank state which are selectively sent through a telephone line and for setting a recording unit in the recording mode only when the message voice of a calling party is received.

It is a third object of the present invention to provide an automatic telephone answering apparatus for keeping a recording unit in the recording mode unless a blank portion is too long even if an incoming message from a calling party is interrupted.

In order to achieve the above objects of the present invention, a signal detecting means is provided for detecting a pulse envelope of an input signal sent through a telephone line and a first counter is provided for counting output pulses from the signal detecting means. After the automatic telephone answering apparatus is automatically engaged with the telephone line upon reception of an incoming call and after an outgoing message has been sent to a calling party, the first counter is reset and then started, and at the same time a second counter (to be described later) is also reset. When a predetermined period of time has elapsed after the first counter is started upon operation of a timer, a comparing means compares a count of the first counter with a reference value. When the count of the first counter is larger than the reference value, a central processing unit determines that a speech signal representing an incoming message of a calling party is being received. The first and second counters are reset again to repeat the above operation. However, if the comparing mean detects that the count of the first counter is smaller than the reference value, the count of the second counter is incremented. When the predetermined period of time set by the timer has elapsed again, the comparing means compares the count of the first counter with the reference value. When the comparison operation is repeated and the comparing means detects that the count of the second counter has reached the predetermined value, the recording means is stopped, and the automatic telephone answering apparatus is set in the standby mode.

Since the reference value is preset to be slightly smaller than the number of average pulses generated by the signal detecting means for detecting the speech signal sent through the telephone line, the first and second counters are reset and the count of the first counter is compared with the reference value upon elapse of each predetermined period of time as long as an incoming message from a calling party continues. Even if an incoming message from a calling party is interrupted, the recording mode can be continued until the count of the second counter reaches the predetermined value, i.e., until a given period of time has elapsed, thereby properly recording the incoming message of a calling party. When a dial tone or a busy tone is received, the count of the first counter does not reach the reference value. When the count of the second counter reaches the predetermined value, the recording state is cancelled, and the automatic telephone apparatus is set in the standby mode. Thus, a speech signal can be correctly distinguished from other signals, thereby properly controlling the recording time.

BRIEF DESCRIPTION OF THE DRAWINGS

FIG. 2 is a flow chart for explaining the operation of the apparatus shown in FIG. 1.

DETAILED DESCRIPTION OF THE PREFERRED EMBODIMENT

Figure 1:
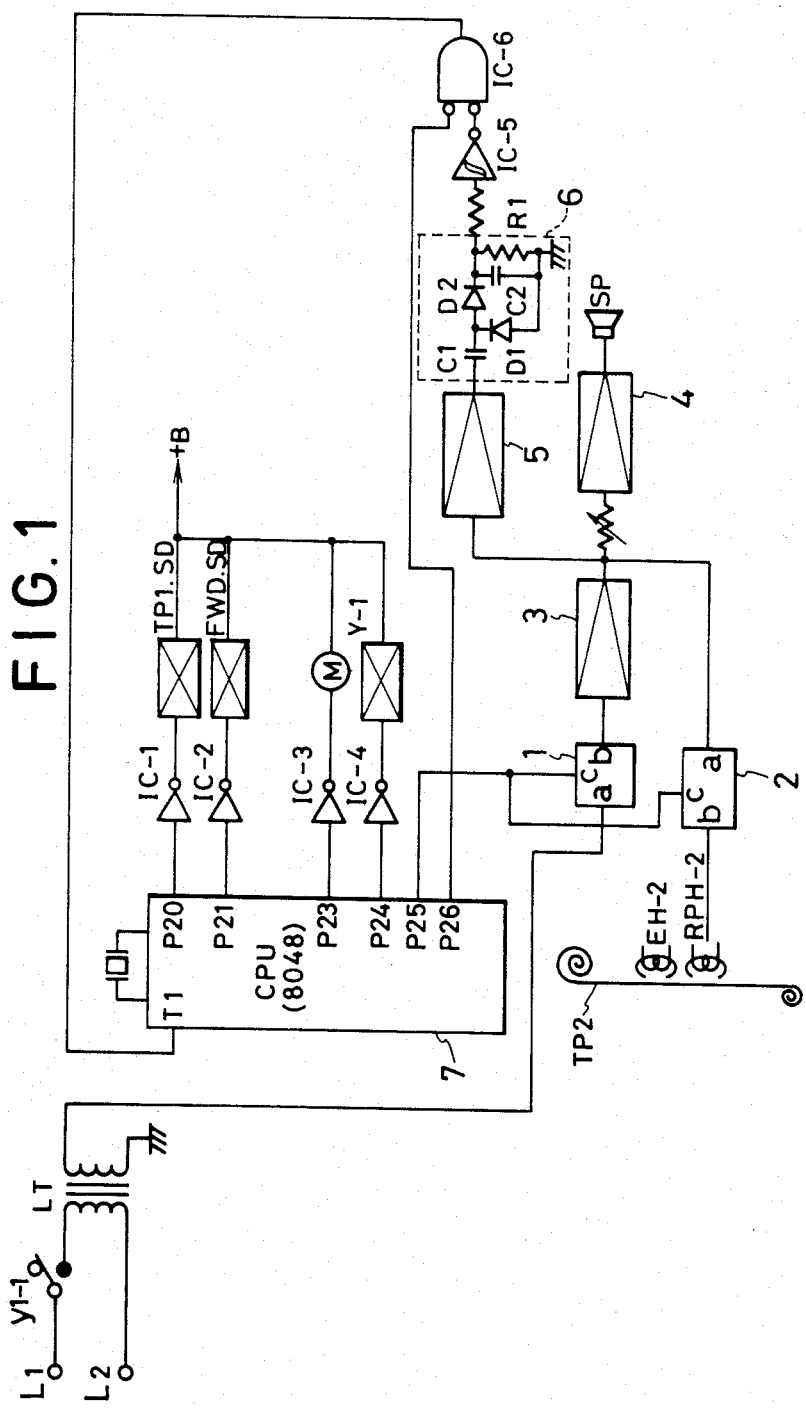
FIG. 1 is a diagram showing the main part of an automatic telephone answering apparatus according to an embodiment of the present invention.

FIG. 1 shows the main part of an automatic telephone answering apparatus according to an embodiment of the present invention. Reference symbols L1 and L2 denote telephone lines; and LT, a line transformer. Reference numeral 7 denotes a microprocessor (to be referred to as a CPU hereinafter) which comprises a CPU 8048 available from Intel Corp. Only the ports of the CPU 7 which are associated with the present invention are illustrated. More particularly, reference symbols P20 to P26 denote output ports; T1 (TEST1), a count input terminal; IC-1 to IC-4, driver ICs, respectively; TP1.SD and FWD.SD, solenoids, respectively; and M, a motor. When the motor M is driven together with the solenoids TP1 SD and FWD.SD, an outgoing message tape (not shown) is driven. However, when the motor M is driven together with only the solenoid FWD.SD, an incoming message tape TP2 is driven. Reference numerals 1 and 2 denote analog switches. When a terminal c is set at logic "1", a path between terminals a and b is rendered conductive. Reference numerals 3, 4 and 5 denote amplifiers; and 6, a rectifying/smoothing circuit for generating an envelope of a busy tone signal. The envelope signal is supplied to a Schmitt trigger circuit IC-5 which generates pulses corresponding to the input signal. The rectifying/smoothing circuit 6 and the Schmitt trigger circuit IC-5 constitute a signal detector. Reference symbol Y-1 denotes a looping relay which has a contact y1-1; SP, a loudspeaker; TP2, an incoming message tape for receiving an incoming message of a calling party; RPH-2, a rec/play head; EH-2, an erase head; and IC-6, an NAND gate.

The operation of the automatic telephone answering apparatus having the arrangement described above will be described with reference to a flow chart of FIG. 2. When a ringing signal is sent to the telephone lines L1 and L2, the signal is detected by a detector (not shown) which is not directly associated with the present invention. The program stored in a ROM is executed to set the output ports P20 to P24 to logic "1". As described above, the outgoing message tape (not shown) is driven, and the relay Y-1 is energized to form a loop through the contact y1-1. An outgoing message is reproduced from the outgoing message tape and sent by a known mechanism (not shown) onto the telephone lines L1 and L2. When the outgoing message is sent out, the end of the outgoing message tape is detected by a known means (not shown), and the output port P20 is set to be logic "0", thereby stopping the outgoing message tape and driving the incoming message tape TP2. At the same time, the output port P25 is set at logic "1", and the analog switches 1 and 2 are turned on to render the path between the terminals a and b conductive. The output port P26 is set at logic "0" to activate the NAND gate IC-6. An incoming message from a calling party is transmitted to the rec/play head RPH-2 through the telephone lines L1 and L2, the line transformer LT, the terminals a and b of the analog switch 1, the amplifier 3, and the terminals a and b of the analog switch 2. At the same time, an output from the amplifier 3 is amplified by the amplifier to an optimal level, and the amplified signal is rectified by diodes D1 and D2 of the rectifying/smoothing circuit 6 and is smoothed by a capacitor C2 therein. The capacitor C2 has a capacitance suitable for obtaining an envelope of the signal. In the arrangement constructed as above, the program is executed upon completion of transmission of the outgoing message. In step 11, a registor R2 as one of the registers incorporated in the CPU 7 is used as a second counter. "8" is set in the register R2. In step 12, a first counter T incorporated in the CPU 7 is cleared to zero. In step 13, the first counter T is started. The first counter T is incremented when an output from the above-mentioned signal detecting means, i.e., a signal enveloped by the speech signal rectifying/smoothing circuit 6 supplied through the Schmitt trigger circuit IC-5 and the NAND gate IC-6 to the terminal T1 of the CPU 7 goes from "1" to "0". In step 14, a soft timer produced by the program in cooperation with registers excluding the register R2 is operated to delay by one second. The flow then advances to step 15. The count of the first counter T for the above-mentioned one second is supplied to an accumulator A in the CPU 7 so as to perform a test to be described later. In step 16, the count of the first counter T is compared with a reference value by a comparing means constituted by the CPU 7. More particularly, the number of pulses supplied from the NAND gate IC-6 to the terminal T1 of the CPU 7 within one second is counted. As a result of this test, a maximum count for one second was about 12 to 13 for the speech signal.

When the count is more than 10, the input signal is regarded as the speech signal, the flow returns to step 10, and the operation is repeated from the beginning. However, when the count is 10 or less, the flow advances to step 17. The count of 10 or less indicates that the input signal (i.e., the incoming message of the calling party) is interrupted, that the incoming message is ended and a silent state is established, or that a dial or busy tone is received. In step 17, the count "8" of the register R2 (i.e., the second counter) which is set in step 1 is decremented by one. Therefore, the count of the second counter is decremented from 8 to 7. The CPU 7 checks in step 18 whether or not the content of the register R2 is zero. In other words, the CPU 7 checks whether or not the second counter is decremented to zero, i.e., whether or not 8 seconds have elapsed. In this case, since the count of the second counter is 7, the flow returns to step 14, and a one-second delay is performed in this step. The flow returns to step 15. In step 16, when the CPU 7 determines that the count of the first counter T is 10 or less, the operations in steps 17, 18, 14 and 15 are repeated. If the accumulated count is more than 10, the CPU 7 determines that the speech signal, i.e., an incoming message from a calling party is being received. The flow then returns to step 10, and the count of the second counter is set to 8.

In the above test results, when the speech signals are continuously received, the count of the first counter reaches more than 10 within one or two seconds. The flow thus returns to step 10, and the count of the second counter can be set to 8 again. Therefore, even if the voice of a calling party is interrupted for a few seconds, the recording operation can be properly continued upon input of the next voice of the calling party.

A case will be described wherein a calling party completes recording a message and hangs up the telephone, and a busy tone is received by the automatic telephone answering apparatus of the present invention. While a calling party continuously sends an incoming message, the count of the register R2 as the second counter is set to 8, as is apparent from the above description. In this state, assume that a calling party hangs up the telephone and that a busy tone is received from the telephone station by the automatic telephone answering apparatus of the present invention. The busy tone comprises an INT where a signal tone is repeatedly generated for every 0.5 seconds at 0.5 second intervals. Assume that this busy tone is received in the apparatus when the program is executed in step 10. As is apparent from the above description, the count of the first counter T is set to 1. The flow then advances to step 17. In step 17, the count of the register R2 as the second counter is decremented to set the count of the second counter to 7. The flow advances to step 14 through step 18. One-second delay is performed in step 18, and the flow advances to step 16 again. Since the CPU 7 determines that the count of the first counter T is 2, the flow advances to step 17. In step 17, the count of the register R2 as the second counter is decremented by one, so that the count thereof is updated to 6. When the above operation is repeated six times and the eighth busy tone is stopped, the count of the second counter becomes zero. The flow then advances from step 18 to step 19. The output ports P21 to P25 of FIG. 1 are set at logic "0", and the output port P26 is set at logic "1", thereby setting the automatic telephone answering apparatus in the standby mode.

When a dial tone is sent from the telephone station to the automatic telephone answering apparatus of the present invention upon on-hook operation of a telephone of a calling party, an output from the rectifying/-smoothing circuit 6 is set at logic "1". The counter input terminal T1 is set at logic "1" through the Schmitt trigger circuit IC-5 and the NAND gate IC-6. Therefore, the count of the first counter T is not incremented. As is apparent from the above description, the automatic telephone answering apparatus of the present invention is reset in the standby mode after eight seconds. When a silent state is established instead of receiving a dial tone, the count of the first counter T is not incremented. Therefore, the automatic telephone answering apparatus is reset in the standby mode after eight seconds in the same manner as described above.

In the above embodiment, the count of the first counter T for one second is compared with the reference value "10" in step 16. When the preset value of the timer is changed, the reference value is accordingly changed. The reference value can be properly set in accordance with the preset value of the timer. The reference value is set to be slightly smaller than the average number of pulses generated from the signal detecting means for detecting a speech signal sent through the telephone lines within the time preset in the timer. In addition, the preset value of the second timer need not be limited to 8, as defined in the above embodiment. A called party can determine a maximum pause time to be made by an incoming message of a possible calling party. In the above embodiment, the maximum pause time is given as about 8 seconds, and the count of the second counter is set in step 11 and decremented in step 17. However, the count of the second counter can be set to zero in step 11 and can be incremented in step 17. In this case, the CPU 7 can check in step 18 whether or not the count of the second counter has reached a predetermined value (8 in the above embodiment).

What is claimed is:

1. An automatic telephone answering apparatus having a voice monitoring function, wherein telephone lines are looped by a loop-forming means upon reception of an incoming call and an outgoing message is automatically sent out and then an incoming voice message of a calling party is automatically recorded by a recording means, comprising:

signal detecting means having means for envelope detecting an input signal sent through the telephone lines and including the incoming voice message of the calling party to obtain an envelope detected input signal, and means for generating a pulse train consisting of pulses and having a frequency corresponding to that of said envelope detected input signal;

a timer for measuring a predetermined period of time from completion of the outgoing message;

a first counter resettable to a first predetermined value and operable for counting pulses generated by said pulse generating means of said signal detecting means during the predetermined period of time measured by said timer;

a second timer resettable to a second predetermined value;

a first comparing means for generating a reference value which is set to a value smaller than a maximum count counted by said first counter when the incoming voice message is continuously supplied to said first counter for the predetermined period of time, and for comparing the count of the pulses in said first counter with the reference value to determine whether the count of the pulses is larger than the reference value;

reset means for resetting said first and second counters when transmission of the outgoing message is completed and it is determined by said first comparing means that the count of the pulses counted by said first counter is larger than the reference value, said first counter starting counting each time said first counter is reset;

said second counter counting each time it is determined by said first comparing means that the count of the pulses counted by said first counter is not larger than the reference value;

a second comparing means for generating a third predetermined value, and for comparing a count in said second counter with the third predetermined value to determine whether the count reaches the third predetermined value;

said timer starting a time measurement each time said first counter is reset, said second counter counting so long as it is not determined by said second comparing means that the count in said second counter reaches the third predetermined value; and restore means responsive to a determination by said second comparing means for rendering said recording means inoperative and for disengaging the looped telephone lines when it is determined by said second comparing means that the count in said second counter reaches the third predetermined value, so as to restore said telephone answering apparatus.

* * * * *

UNITED STATES PATENT AND TRADEMARK OFFICE
CERTIFICATE OF CORRECTION

PATENT NO. : 4,675,897
DATED : June 23, 1987
INVENTOR(S) : Kazuo HASHIMOTO

It is certified that error appears in the above-identified patent and that said Letters Patent is hereby corrected as shown below:

Cover page, item [30] should be inserted as follows:

--[30] Foreign Application Priority Data
  March 21, 1984 [JP]  Japan .............53957/1984--

Signed and Sealed this

Fifteenth Day of December, 1987

Attest:

DONALD J. QUIGG

Attesting Officer      Commissioner of Patents and Trademarks